United States Patent
Linnen et al.

(10) Patent No.: US 10,846,418 B2
(45) Date of Patent: Nov. 24, 2020

(54) LOCATION-BASED AUTHENTICATION AND MONITORING FOR DATA STORAGE DEVICES

(71) Applicant: Western Digital Technologies, Inc., San Jose, CA (US)

(72) Inventors: Daniel Joseph Linnen, Naperville, IL (US); Avinash Rajagiri, San Jose, CA (US); Srikar Peesari, San Jose, CA (US); Ashish Ghai, San Jose, CA (US); Dongxiang Liao, Sunnyvale, CA (US); Rohit Sehgal, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 253 days.

(21) Appl. No.: 15/849,652

(22) Filed: Dec. 20, 2017

(65) Prior Publication Data
US 2019/0188403 A1 Jun. 20, 2019

(51) Int. Cl.
| G06F 11/07 | (2006.01) |
| G06F 21/88 | (2013.01) |
| H04L 29/06 | (2006.01) |
| G06F 11/34 | (2006.01) |
| G06F 21/62 | (2013.01) |
| G06F 21/60 | (2013.01) |
| H04W 12/06 | (2009.01) |

(52) U.S. Cl.
CPC ...... *G06F 21/6218* (2013.01); *G06F 11/3476* (2013.01); *G06F 21/604* (2013.01); *H04L 63/08* (2013.01); *H04W 12/06* (2013.01)

(58) Field of Classification Search
CPC ..... H04W 12/06; H04W 8/18; G06F 11/0778; G06F 11/0727; G06F 11/0751; G06F 21/6218; G06F 21/604; G06F 21/88; G06F 11/3476; G06F 11/079; G06F 11/0775; G06F 11/0787; H04L 63/08
See application file for complete search history.

(56) References Cited

U.S. PATENT DOCUMENTS

| 7,020,456 B2 | 3/2006 | Smeets et al. |
| 8,458,526 B2 | 6/2013 | Dalphy et al. |
| 9,720,700 B1 * | 8/2017 | Brown ................ G06F 13/4068 |
| 9,900,317 B2 * | 2/2018 | Cantrill ............... G06F 21/6218 |

(Continued)

OTHER PUBLICATIONS

"Everykey—No More Passwords, No More Keys", available at: https://everykey.com, last accessed Dec. 20, 2017, 13 pgs.

*Primary Examiner* — Alexander Lagor
*Assistant Examiner* — Vu V Tran
(74) *Attorney, Agent, or Firm* — Barry IP Law, P.C.

(57) ABSTRACT

A Data Storage Device (DSD) or a server is set to an unlocked state to allow access to a memory of the DSD or to a DSD of the server. Communication is established with an access station using a wireless communication interface, and an access code is received from the access station via the wireless communication interface. If the received access code is determined to be valid, the DSD or server is set to the unlocked state. According to another aspect, communication is established with a DSD or a server using a wireless communication interface, and an access code is generated and sent to the DSD or the server for setting the DSD or the server to the unlocked state.

24 Claims, 9 Drawing Sheets

(56) References Cited

U.S. PATENT DOCUMENTS

| | | | |
|---|---|---|---|
| 2003/0046567 A1* | 3/2003 | Carman | G06F 21/34 |
| | | | 713/193 |
| 2005/0251597 A1 | 11/2005 | Zhang | |
| 2008/0288712 A1 | 11/2008 | Cornwell et al. | |
| 2015/0142140 A1* | 5/2015 | Yamaguchi | G06N 7/005 |
| | | | 700/50 |
| 2015/0365512 A1* | 12/2015 | MacKenzie | H04W 12/08 |
| | | | 455/420 |
| 2016/0099941 A1* | 4/2016 | Hein | H04L 67/02 |
| | | | 726/4 |
| 2016/0277970 A1* | 9/2016 | Werneke | H04L 67/00 |
| 2017/0031742 A1* | 2/2017 | Jilani | G06F 11/079 |
| 2017/0139765 A1 | 5/2017 | Ko et al. | |
| 2018/0189195 A1* | 7/2018 | Chun | G06F 21/79 |
| 2019/0069436 A1* | 2/2019 | Norton | G06F 21/32 |

\* cited by examiner

LOCATION-BASED AUTHENTICATION AND MONITORING FOR DATA STORAGE DEVICES

BACKGROUND

Data centers are becoming increasingly important as more data is stored remotely, such as with cloud storage. In addition, the number of Data Storage Devices (DSDs) in data centers is increasing to allow for the storage of more data remotely. The data stored in the DSDs can include highly sensitive information, such as, for example, account numbers or social security numbers, or personal data such as medical records.

Data centers typically include physical security measures such as, for example, limiting access to server rooms where the DSDs are located. The DSDs may also use encryption to encrypt data stored on the DSD to further protect unauthorized access to the data. In such cases, a login and password may be required from a server connected to a DSD to unlock the encryption for the DSD so that data may be accessed. However, the foregoing security measure may be bypassed after the DSD has been unlocked by keeping the DSD externally powered so that it can be removed from the data center with the encryption still unlocked.

In addition, data centers generally require a high level of reliability and the quick resolution of failures, such as when a DSD becomes inaccessible due to an error or a server crashing. Since data centers do not typically allow for failed DSDs to be removed from the data center, technicians must usually troubleshoot and repair or replace the DSD on site. Given that the failed DSD or server may not be fully operable and the equipment taken onsite may be limited, diagnosing and repairing the failure is often very difficult, especially within a short-time frame expected by a data center. The amount of operational and/or error logging performed by the DSD may also be limited due to tradeoffs in operational performance and data storage capacity. The lack of operational logs or error logs can also hinder the diagnosis and repair of a failed DSD or server.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example System Overview

Figure 1:
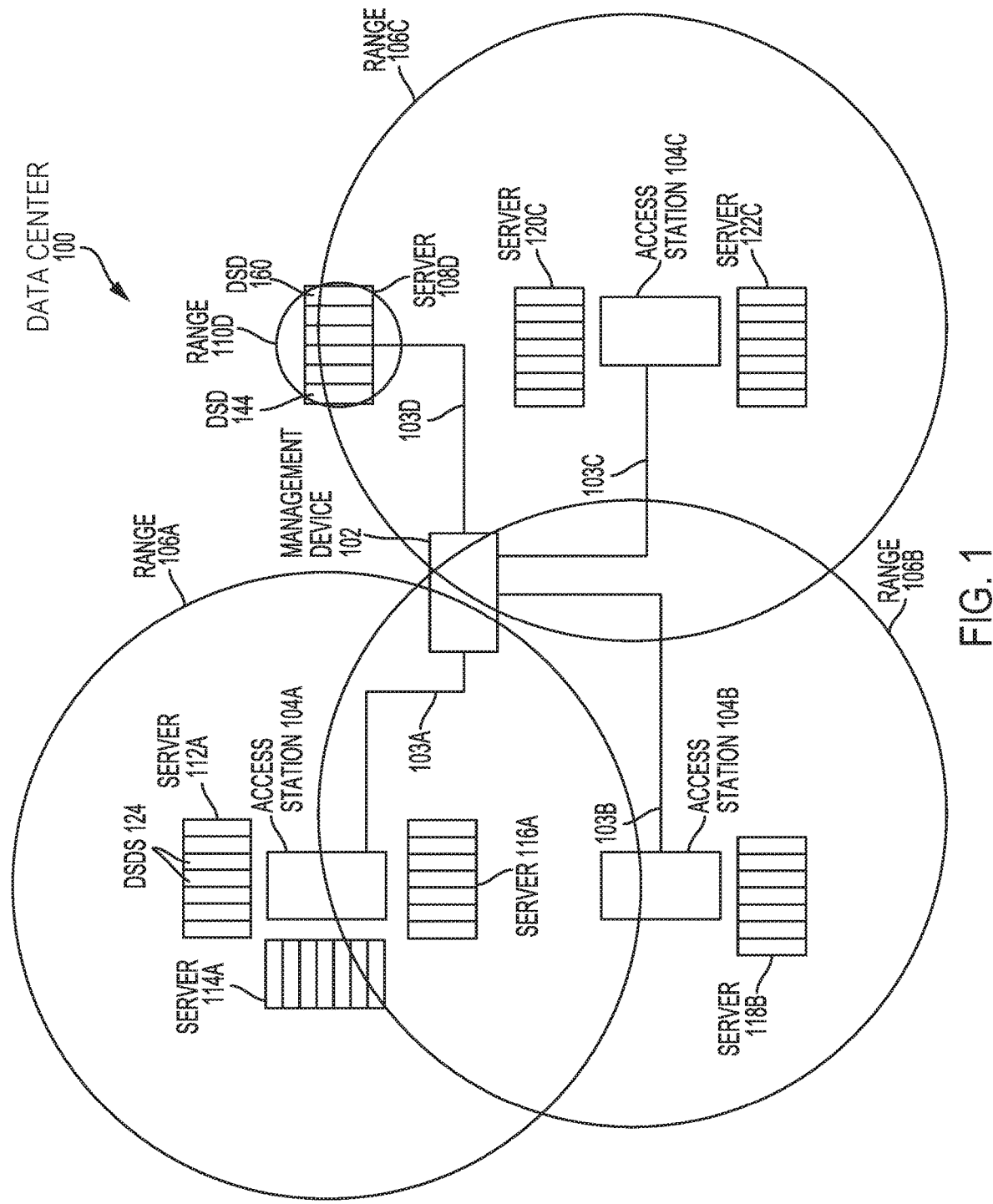
FIG. 1 is an example of a data center including a plurality of Data Storage Devices (DSDs) and access stations according to an embodiment.

FIG. 1 is an example of a data center including a plurality of Data Storage Devices (DSDs) and access stations according to an embodiment. As shown in FIG. 1, data center 100 includes access stations 104A, 104B, and 104C. The access stations can comprise, for example, a computer system such as a desktop computer or a laptop computer, or a server.

Each access station in FIG. 1 wirelessly communicates with DSDs included in one or more servers, or wirelessly communicates with a server. For example, access station 104A wirelessly communicates with the DSDs in servers 112A, 114A, and 116A, and access station 104B wirelessly communicates with the DSDs in server 118B. Access station 104C, on the other hand, wirelessly communicates with servers 120C and 122C, instead of wirelessly communicating with the individual DSDs included in the server. The example of server 108D provides yet another implementation where server 108D acts as an access station by wirelessly communicating with each of the DSDs included in server 108D.

Figure 2:
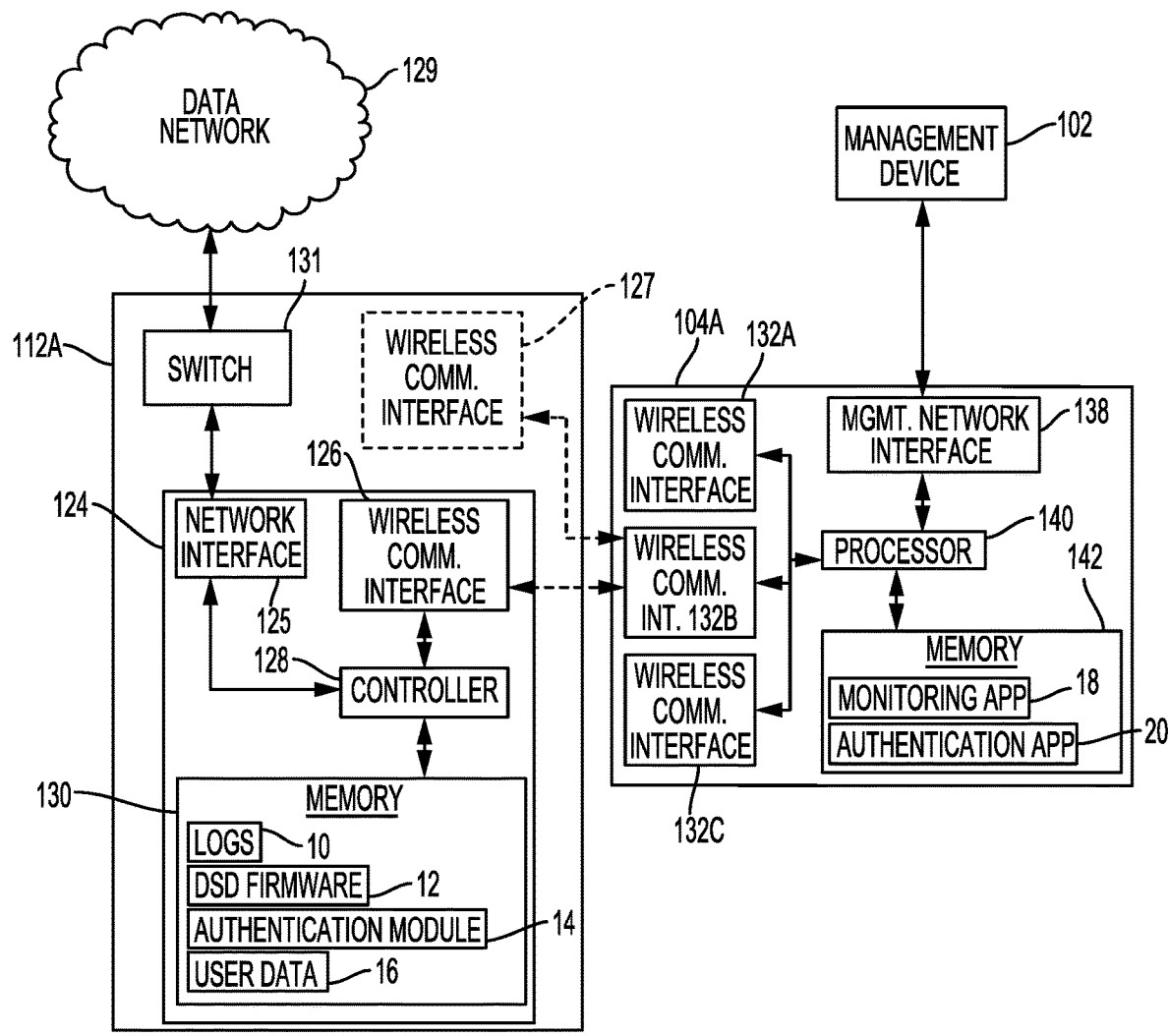
FIG. 2 is a block diagram of a DSD and an access station according to an embodiment.
Figure 3:
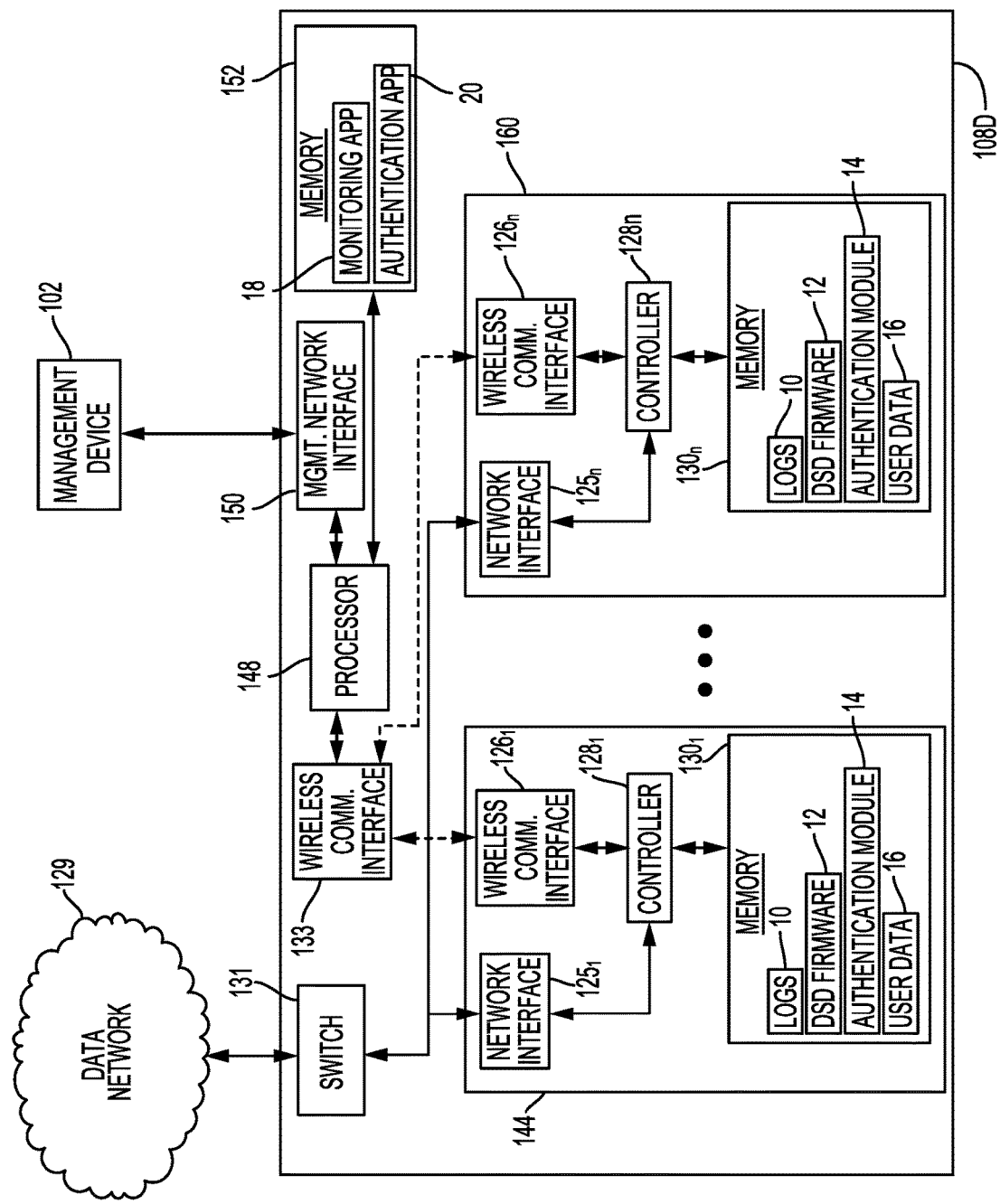
FIG. 3 is a block diagram of a server including a plurality of DSDs according to an embodiment.

Each server may comprise, for example, a microserver or blade server that supplies power and communication for accessing data stored in the DSDs via a data network or bus, such as data network 129 shown in FIGS. 2 and 3. In some implementations, the server may manage operation of the DSDs using, for example, a Baseboard Management Controller (BMC) (not shown), and may switch network traffic for the data network or bus to the appropriate DSD included in the server. In this regard, each server provides at least one of power to the DSDs in the server and a connection to a data network for the DSDs. The number of DSDs included in each server may vary. In some examples, each server may include 50 to 100 DSDs. In other examples, a server may only include a single DSD. In the example of FIG. 1, server 112A includes multiple DSDs 124, and server 108D includes multiple DSDs from DSD 144 to 160. Further description of these DSDs is provided in more detail below with reference to FIGS. 2 and 3.

In the example of FIG. 1, access stations 104A, 104B, and 104C can wirelessly communicate with DSDs or servers within a wireless communication range or physical distance to allow access to data stored in the DSDs or the servers via a separate data network or bus. Access to data stored in a DSD may be allowed or prevented based on authentication of a DSD or a server using an access code. The access code may be generated by the access station, and wirelessly sent from the access station to the DSD or server. In the case of server 108D, an access code may be generated by server 108D for wireless authentication with a DSD in server 108D, such as DSD 144 or DSD 160.

The range of the wireless communication ordinarily requires a DSD or server to be within the range of the wireless signal for data to be accessed (e.g., read or written in the DSD). This can provide an additional level of security for the DSDs or a server by requiring the DSDs or the server to be within a relatively close physical proximity to the access station. The wireless communication may use, for example, a Bluetooth connection, a Near Field Communication (NFC) connection, or a WiFi connection.

The range of wireless communication for each of access stations 104A, 104B, 104C, and server 108D is shown in FIG. 1 with ranges 106A, 106B, 106C, and 110D, respectively. As shown in the example of FIG. 1, the ranges may overlap such that a server or a DSD may select from among multiple access stations for wireless authentication. In some implementations, the DSD or server may be paired with a particular access station, or server as in the case of the DSDs in server 108D, so that wireless authentication may only be made with one particular access station. In other implementations, the DSD or server may select an access station for authentication that has a strongest wireless signal.

Each of access stations 104A, 104B, 104C, and server 108D are connected to management device 102 via connections 103A, 103B, 103C, and 103D, respectively. In some implementations, access stations 104A, 104B, 104C, and server 108D may communicate with management device 102 on a management network separate from the data network, which may also include communication with the servers. In the example of FIG. 1, the connections to management device 102 are a physical connection, such as through an Ethernet connection. However, other embodiments may use a wireless connection, such as WiFi, for communication with management device 102. In some implementations, the communication between the access stations and management device 102 may be on a management network.

As discussed in more detail below with reference to FIG. 9, management device 102 may receive information about one or more DSDs, such as operational or error logs, from an access station that wirelessly communicates with the DSD. An access station may monitor the health or operation of DSDs using its wireless connection to the DSD or a server, and send indications of a health state of the DSD to management device 102.

As discussed in more detail below with reference to FIG. 10, the wireless connection to a DSD or server may also provide an alternate data communication path when a primary data communication path is not operating properly. Commands to read or write data in a DSD may be sent from management device 102 to an access station, which wirelessly sends the command to the DSD.

FIG. 2 is a block diagram of a DSD 124 in server 112A, and access station 104A according to an embodiment. As shown in FIG. 2, DSD 124 includes controller 128, which includes circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof. In some implementations, controller 120 can include a System on a Chip (SoC).

As shown in FIG. 2, DSD 124 includes memory 130, which can include, for example, a non-volatile memory, such as a Hard Disk (HD), a solid-state memory, or a combination of different types of memory, as in the case where DSD 124 is a Solid-State Hybrid Drive (SSHD). While the description herein refers to solid-state memory generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistive RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete Non-Volatile Memory (NVM) chips, or any combination thereof.

In the example of FIG. 2, memory 130 stores logs 10, which can include one or more operational logs and/or error logs indicating a status or health of DSD 124. For example, logs 10 may include information about an amount of time that DSD 124 has been in operation, a number of write commands performed to write data in the DSD or an amount of data written in the DSD, a remaining available storage capacity, a defect mapping of a storage media, a number of read and/or write errors, or a count or timestamps for failed authentication attempts. As discussed in more detail below with reference to FIG. 9, logs 10 may be sent to an access station for monitoring or troubleshooting the DSD.

In FIG. 2, memory 130 also stores DSD firmware 12, which can include computer-executable instructions for operating DSD 124, such as for performing the DSD authentication processes discussed below. In this regard, authentication module 14 may form part of DSD firmware 12 in some implementations, or may be a stand-alone application for wirelessly authenticating access to DSD 124. Controller 128 may load DSD firmware 12 or authentication module 14, or portions thereof, for execution as needed.

User data 16 stored in memory 130 can include data to be accessed via data network 129. User data 16 may be encrypted or otherwise protected such that controller 128 may need to decrypt user data 16 using a key and an algorithm or cipher before sending user data 16 via network interface 125 to switch 131 of server 112A. In addition, controller 128 may need to encrypt data before modifying or writing data for a write command received from data network 129 via switch 131. In some implementations, the key and/or cipher used for encryption and decryption may change based on the time the data is written or read, such that after authentication with the access station, a new key and/or cipher is used. Switch 131 may include one or more interfaces for communicating with the DSDs in the server and on data network 129, such as, for example, multiple Ethernet switches.

As discussed in more detail below, controller 128 may prevent access to user data 16 before DSD 124 is wirelessly authenticated, and then allow access to user data 16 after wirelessly authenticating DSD 124 with access station 104A. Although some implementations may use encryption and decryption to prevent access to user data 16 before authentication, controller 128 in other implementations may block or otherwise prevent the performance of read or write commands received via network interface 125 until DSD 124 has been wirelessly authenticated. In such implementations, controller 128 may return an error message and/or buffer the commands for performance after authentication.

Wireless communication interface 126A of DSD 124 is configured to wirelessly communicate with wireless communication interface 132A, 132B, or 132C of access station 104A. As noted above, the wireless communication may use, for example, a Bluetooth standard, a WiFi standard, or a NFC standard. In other implementations, such as with the example of server 118B and access station 104B in FIG. 1, the access station may wirelessly communicate with the server instead of with the individual DSDs within the server. In such an example, wireless communication interface 132A, 132B, or 132C would wirelessly communicate with wireless communication interface for the server, such as wireless communication interface 126B of server 112A, to authenticate all of the DSDs within the server.

Access station 104A includes wireless communication interfaces 132A, 132B, and 132C to provide greater bandwidth for wireless communication with multiple DSDs at the same time. Other implementations may have a different number of wireless communication interfaces or may use a single wireless communication interface.

Processor 140 of access station 104A can include, for example, circuitry such as one or more processors for executing instructions and can include a microcontroller, a DSP, an ASIC, an FPGA, hard-wired logic, analog circuitry and/or a combination thereof. In some implementations, controller 120 can include an SoC. Processor 140 executes computer-executable instructions, such as monitoring application 18 or authentication application 20 for communication with DSDs in server 112A via a wireless communication interface 132, or for communication with management device 102 via management network interface 138.

FIG. 3 is a block diagram of server 108D including a plurality of DSDs according to an embodiment. A description of components having a similar reference number in FIG. 2 is omitted below, since an understanding of such components can be obtained with reference to the corresponding description above for such components.

As shown in FIG. 3, server 108D includes DSDs 144 to 160, which each have their own wireless communication interface, such as wireless communication interfaces 154 and 162, for wirelessly communicating with wireless communication interface 146 of server 108D. Unlike the example of DSD 124 and access station 104A in FIG. 2, each of the DSDs in server 108D in FIG. 3 wirelessly communicate with server 108D instead of with an external access station. In this regard, some implementations of server 108D may use a relatively short range wireless communication connection, such as an NFC connection, as compared to a Bluetooth or WiFi connection.

In addition, server 108D includes memory 152 storing monitoring application 18 and authentication application 20, which can be executed by processor 148 to wirelessly monitor and authenticate the DSDs in server 108D, as in the example of FIG. 2 discussed above, but without using a dedicated access station. Server 108D may provide information, such as information included in logs 10 or derived from logs 10 related to the health or status of a DSD within server 108D, to management device 102 via management network interface 150.

After wireless authentication, a DSD in server 108D, such as DSD 144 or DSD 160, allows access to user data 16 by a remote device on data network 129 via network interface 125 of the DSD and switch 131 of server 108D. As discussed above, allowing access to user data 16 can include decrypting the user data to allow for reading user data 16 or encrypting data to be written to user data 16 so that the data written can be deciphered after it is later decrypted when read. In other implementations, controller 128 may block or otherwise prevent the performance of read and write commands received via network interface 125 until the DSD has been wirelessly authenticated. Controller 128 may return an error message and/or buffer blocked commands until the DSD is authenticated. In yet other implementations, processor 148 of server 108D may instead block commands for a particular DSD until the DSD has been wirelessly authenticated. In such implementations, processor 148 may return an error message and/or buffer the commands for performance after authentication.

Wireless Authentication Examples

Figure 4:
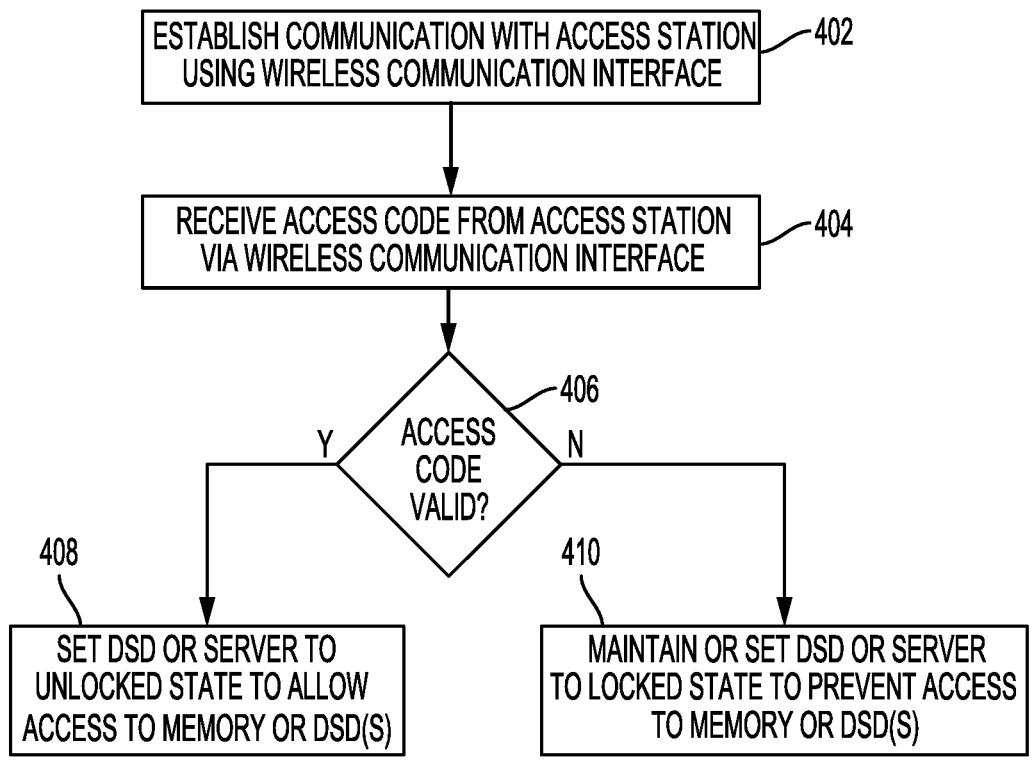
FIG. 4 is a flowchart for an authentication process according to an embodiment.

FIG. 4 is a flowchart for a DSD or server authentication process that can be performed by controller 128 of a DSD executing authentication module 14, or by a processor of a server executing authentication module 14 according to an embodiment. For example, controller 128 in DSD 124 of FIG. 2 may perform the authentication process of FIG. 4 to allow or prevent access to user data 16 stored in memory 130 based on an access code received from access station 104A via wireless communication interface 126. In another example, a processor of server 118B may perform the authentication process of FIG. 4 to allow or prevent access to data stored in the DSDs of server 118B based on an access code received from access station 104B in FIG. 1 via a wireless communication interface of server 118B.

In some cases, the authentication process of FIG. 4 may be performed as part of an initialization or booting of the DSD (e.g., DSD 124 in FIG. 2) or the server (e.g., server 118B) after powering-up the DSD or the server. In other cases, the authentication process of FIG. 4 may be performed periodically, such as after a predetermined time of operation, after a predetermined amount of data has been accessed (i.e., read and/or written) in the DSD or the server, or after a change in data access that is greater than a threshold. For example, the threshold may include a threshold size of a data request and/or a number of commands queued for performance by the DSD. In such an example, an authentication may become due after the DSD suddenly receives numerous large data requests, which may indicate that the data stored in the DSD is being copied from the DSD.

In block 402, the controller or processor establishes communication with an access station using a wireless communication interface of the DSD or the server. The access station may include a dedicated access station, as in the case of dedicated access stations 104A, 104B, and 104C in FIG. 1, or the access station may include a device that performs other functions, as in the case of server 108D in FIG. 1. The controller or processor may establish wireless communication with a designated access station, or with an access station providing a strongest wireless communication signal. In some implementations, the DSD or server may send a beacon signal indicating the presence of the DSD or the server, and wait for an acknowledgment returned from the access station in order to establish wireless communication with the access station.

In block 404, the controller or the processor receives an access code from the access station (e.g., one of access stations 104A, 104B, and 104C, or server 108D in FIG. 1). In some implementations, the access code can be generated by the access station using a key or credential, and a time that the access code is generated. In such implementations, a symmetric key or credential may be generated by the DSD, the access station, the server, or management device 102 and stored locally at both the access station and the DSD.

In block 406, the controller or processor determines whether the access code received in block 404 is valid. This can include, for example, decrypting the access code using the key or credential stored locally at the DSD or the server and comparing a time included in the decrypted access code with a current time determined locally at the DSD or the server, or determined from communication on a network (e.g., data network 129 in FIG. 1 or a management network), such as from management device 102. In determining whether the access code is valid, the controller or processor may allow for some variation in the time, such as a variance or range of one second, for example. In other implementations, the controller or processor may decrypt the access code to identify a key or other credential for comparison to a local key or credential generated by the DSD or the server, such that the access code is determined to be valid if the key or credential for the received access code matches the locally generated key or credential.

In some implementations, the local key or credential may be revoked or erased from the DSD in response to the DSD being physically removed or disconnected from a server. In such implementations, a new key or credential for determining whether an access code is valid is generated or stored in the DSD when the DSD is first connected to or returned to a particular server. This can ordinarily provide an additional level of security by requiring the DSD to be connected to a designated server in order to use the key or credential for determining whether a wirelessly received access code is valid.

If it is determined in block 406 that the access code is valid, the controller or processor in block 408 sets the DSD or the server to an unlocked state to allow access to the memory in the DSD or to the DSDs in the server. Setting a memory or DSD to an unlocked state can include, for example, enabling decryption of data stored in the memory or the DSD, and enabling encryption of data for write commands to store data in the memory or the DSD, so that the data can later be deciphered properly when accessed with a read command. In other cases, setting the memory or DSD to the unlocked state can include allowing commands to read or write data in the memory or DSD to be performed that would otherwise be blocked by the controller or processor. In some implementations, the enabling of decryption and/or encryption can include selecting a particular key and/or algorithm for decryption and encryption based on a current time.

If it is determined in block 406 that the received access code is not valid, the controller or processor in block 410 maintains or sets the DSD or server to a locked state to prevent access to the memory or the DSDs in the server. The maintaining or setting of the DSD or server to the locked state can include, for example, disabling or not enabling encryption and/or decryption of data, or blocking the performance of commands to access user data in the memory or in DSDs of the server. In cases where commands are blocked, the controller or processor may return an error message indicating that the command was blocked, or may buffer the command for later performance after authentication has been successfully completed.

By wirelessly authenticating a DSD as described above, it is ordinarily possible to ensure that the DSD is within a physical proximity or wireless range of the access station to allow access to data in the DSD. Such wireless authentication can prevent, for example, access to data in the DSD after the DSD has been unlocked and removed from a data center while keeping the DSD externally powered. The foregoing wireless authentication can provide an additional level of security, or serve as an alternative security measure, to a login and password that may be required from a server to allow access to the DSD or to unlock encryption at the DSD.

Figure 5:
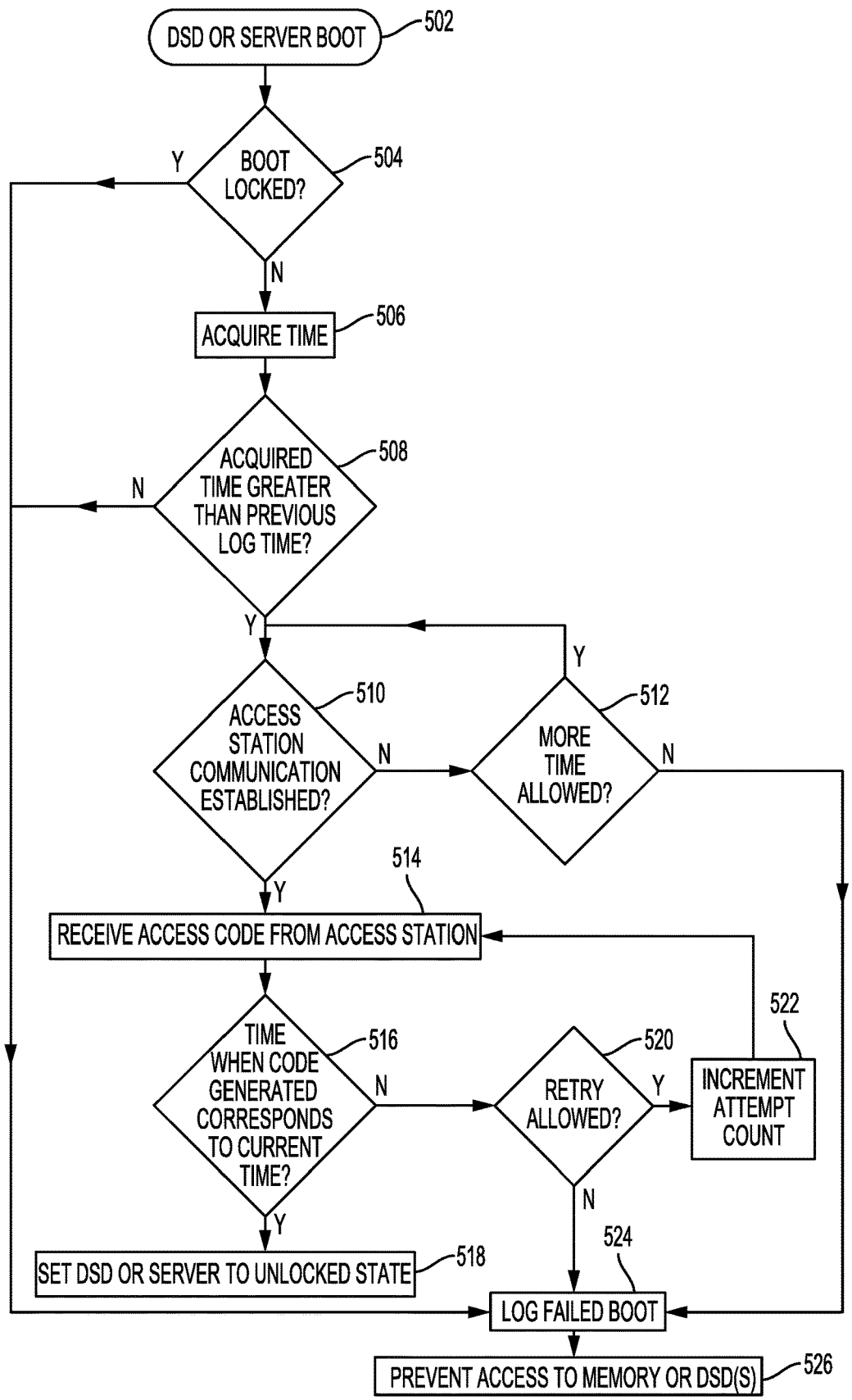
FIG. 5 is a flowchart for a boot-up authentication process according to an embodiment.

FIG. 5 is a flowchart for a boot-up authentication process that can be performed by controller 128 of a DSD executing authentication module 14, or by a processor of a server executing authentication module 14 according to an embodiment. For example, controller 128 in DSD 124 of FIG. 2 may perform the authentication process of FIG. 5 to allow or prevent access to user data 16 stored in memory 130 based on an access code received from access station 104A via wireless communication interface 126. In another example, a processor of server 118B may perform the authentication process of FIG. 5 to allow or prevent access to data stored in the DSDs of server 118B based on an access code received from access station 104B in FIG. 1 via a wireless communication interface of server 118B.

The boot-up authentication process of FIG. 5 ordinarily ensures that a DSD is within a physical proximity or wireless range of an access station before access is allowed to data in the DSD.

In block 502, the DSD or server boots-up, such as after the DSD or server is powered-up. In block 504, the controller or the processor checks whether the DSD or server is boot locked. The DSD or server may be boot locked, for example, after a predetermined number of failed attempts to authenticate the DSD or the server. If the DSD or server is boot locked, the controller or processor proceeds to block 524 to log the failed boot, such as in logs 10 in FIG. 2 or FIG. 3. The controller or processor then prevents access to the memory (e.g., memory 130 in FIGS. 2 and 3) or to DSDs (e.g., DSDs 144 to 160 in FIG. 3) in the server. Preventing access can include, for example, disabling or not enabling encryption and decryption needed to encrypt and decrypt user data 16, blocking commands to read or write data in the memory or the DSDs, or shutting down the DSD or DSDs. In some high security implementations, preventing access can include preventing all future use of the DSD or DSDs by permanently shutting down the DSD or DSDs, or performing a self-destruct operation to damage at least one component, such as the memory, so that it cannot be used to access data.

On the other hand, if it is determined in block 504 that the DSD or DSDs are not boot locked, the controller or processor in block 506 acquires a current time. The current time may be acquired from a local clock at the DSD or the server, or may be acquired via a network, such as from a device on data network 129, or a device on a management network, such as management device 102.

In block 508, the controller or processor optionally determines whether the current acquired time is greater than a previous time logged from a previous authentication. The previous time may be included in, for example, logs 10. If the time acquired in block 506 is not greater than the previous time, the process proceeds to block 524 to log a failed boot attempt, and to prevent access to the memory or the DSDs. The time comparison in block 508 ordinarily prevents unauthorized access by providing the DSD or the server with an earlier time in block 506 in order to improperly authenticate the DSD or server using an earlier access code that may have been intercepted or recorded by a hacker.

If the time acquired in block 506 is greater than the previous log time, the controller or processor in block 510 determines whether wireless communication has been established with the access station. As noted above, in some implementations the access station may be a server, such as with server 108D in FIG. 1. The wireless communication can use, for example, Bluetooth, WiFi, or NFC. The controller or processor in block 510 may determine that the wireless communication with the access station has been established based on, for example, an acknowledgement received from the access station via a wireless communication interface.

If wireless communication has not been established in block 510, the controller or processor in block 512 determines whether more time is allowed for establishing wireless communication with the access station. In some implementations, a timeout window may be used for limiting the amount of time allowed to establish wireless communication with the access station. If more time is allowed, the process returns to block 510 to determine whether wireless communication has been established. If more time is not allowed, the process proceeds to block 524 to log the failed boot attempt, and to prevent access to the memory or to the DSDs in block 526.

If wireless communication has been established in block 510, the controller or processor receives an access code from the access station in block 514. In some implementations, the controller or processor requests the access code from the access station using the wireless communication established in block 510. The access code can be an encrypted message that is encrypted using a shared or symmetric key for each of the DSD and the access station, or for the server and the access station. In the example of FIG. 5, the access code includes an indication of when the access code was generated, such as a timestamp encrypted using a shared key.

In block 516, the controller or processor determines whether the time when the code was generated corresponds to a current time. In some implementations, the current time may be the time acquired in block 508. In other implementations, the current time may be a new or updated time acquired from the same source as in block 508. The controller or processor may also allow for some amount of variance in the comparison of the time indicated by the access code and the current time, such as plus or minus a second, for example.

If the time when the access code was generated corresponds to the current time in block 516, the controller or processor in block 518 sets the DSD or the server to an unlocked state. As discussed above, this can include enabling encryption and decryption of user data 16 or allowing read and write commands to be performed that would otherwise be blocked before setting the DSD or the server to the unlocked state.

If the time when the access code was generated does not correspond to the current time block 516, the process proceeds to block 520 to determine whether an authentication retry is allowed. If so, an authentication attempt count is incremented in block 522, and the process returns to block 514 to receive a new access code from the access station. The attempt count is maintained at the DSD or server, and may be included in, for example, logs 10. The controller or processor in block 514 may send a request for the new access code via the wireless communication interface.

If a retry is not allowed in block 520, the process proceeds to block 524 to log the failed boot, and to prevent access to the memory or to the DSDs in block 526. The number of retries may be a predetermined number of allowed retries or boot attempts stored in a memory of the DSD or the server. The attempt count may be compared to the predetermined number of allowed retries in block 520 to determine whether an authentication retry is allowed. In implementations where authentication must be successful on the first attempt, blocks 520 and 522 may be omitted so that the failed boot attempt is logged in block 524 if the time when the access code was generated does not correspond to the current time in block 516, and access is prevented in block 526 without allowing another attempt to authenticate.

Figure 6:
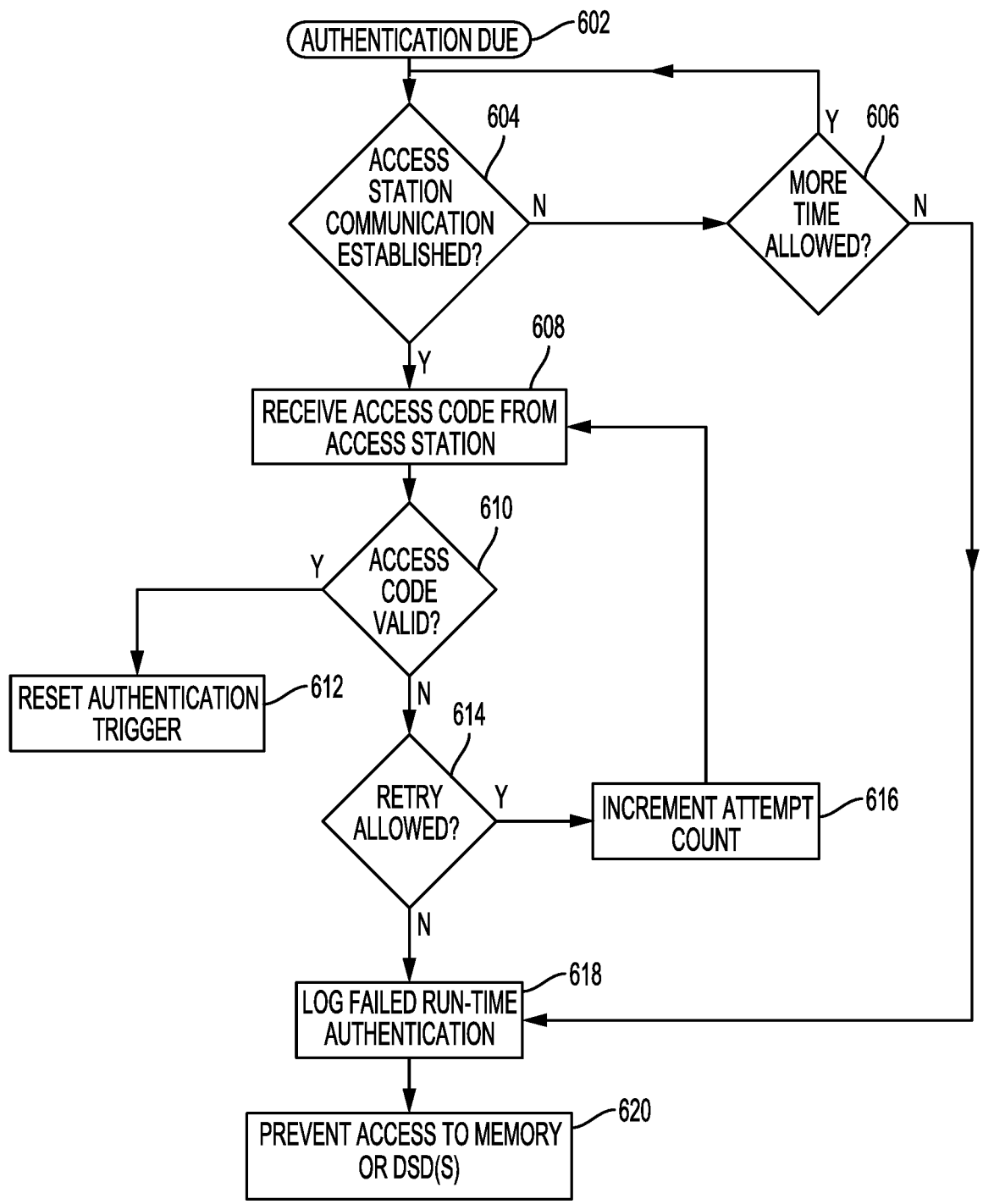
FIG. 6 is a flowchart for a periodic authentication process according to an embodiment.

FIG. 6 is a flowchart for a periodic authentication process that can be performed by a controller of a DSD or a processor of a server executing authentication module 14 according to an embodiment. In the example of FIG. 6, the controller or processor periodically authenticates the DSD or server to continue to allow access to memory 130 or to DSDs in the server.

In block 602, a periodic authentication becomes due. The periodic authentication may become due after at least one of a predetermined amount of time since a previous authentication, after a predetermined amount of data has been accessed, and after a change in data access that is greater than a threshold. As noted above, the threshold may include a threshold size of a data request and/or a number of commands queued for performance by the DSD.

In block 604, the controller or processor determines whether wireless communication has been established with an access station. As with the boot-up authentication process of FIG. 5, the access station in the periodic authentication process of FIG. 6 can include a dedicated access station (e.g., access stations 104A, 104B, or 104C in FIG. 1), or may include a server that acts as an access station for authenticating DSDs in the server (e.g., server 108D in FIG. 1). The wireless communication can use, for example, Bluetooth, WiFi, or NFC. The controller or processor in block 604 may determine that wireless communication with the access station has been established based on, for example, an acknowledgement received from the access station via a wireless communication interface.

If wireless communication has not been established in block 604, the controller or processor in block 606 determines whether more time is allowed for establishing wireless communication with the access station. In some implementations, a timeout window may be used for limiting the amount of time allowed for establishing wireless communication with the access station. If more time is allowed, the process returns to block 604 to determine whether wireless communication has been established. If more time is not allowed, the process proceeds to block 618 to log the failed run-time authentication attempt in block 618, and to prevent access to the memory or DSDs in block 620.

As with the boot authentication process of FIG. 5 discussed above, preventing access to the memory or the DSDs can include, for example, disabling or not enabling encryption and decryption needed to encrypt and decrypt user data 16, blocking commands to read or write data in the memory or the DSDs, or shutting down the DSD or DSDs. In some high security implementations, preventing access can include preventing all future use of the DSD or DSDs by permanently shutting down the DSD or DSDs, or performing a self-destruct operation to damage at least one component, such as the memory, so that it cannot be used to access data.

If wireless communication has been established in block 604, the controller or processor receives an access code from the access station in block 608. In some implementations, the controller or processor may request the access code from the access station via the wireless communication established in block 604. The access code can be an encrypted message that is encrypted using a shared or symmetric key for each of the DSD and the access station, or for the server and the access station. The access code can include an indication of when the access code was generated, such as a timestamp encrypted using the shared key.

In block 610, the controller or processor determines whether the access code is valid. In some implementations, the controller or processor may determine whether the access code is valid by determining whether an encoded time included in the access code corresponds to a current time. In other implementations, the controller or processor may decrypt the access code to identify a key or other credential for comparison to a local key or credential generated by the DSD or the server, such that the access code is determined to be valid if the key or credential for the received access code matches the locally generated key or credential. In implementations where the determination of whether the access code is valid depends on a time, the controller or processor may also verify whether a current time received from a local clock or from a network is after a previously logged time to help ensure that a previous access code is not being improperly reused.

If the access code is determined to be valid in block 610, the controller or processor in block 612 can reset an authentication trigger, such as a timer for tracking the amount of time since a last authentication, or a value for tracking the amount of data accessed since a last authentication. The processing of read and write commands can then continue, which may include the continued enabling of encryption and decryption of user data 16, or continuing to allow read and write commands to be performed that would otherwise be blocked when the DSD or server is set to a locked state.

On the other hand, if the access code is determined not to be valid in block 610, the process proceeds to block 614 to determine whether an authentication retry is allowed. If so, an authentication attempt count is incremented in block 616, and the process returns to block 608 to receive a new access code from the access station. The attempt count is maintained at the DSD or server, and may be included in, for example, logs 10. The controller or processor in block 608 may send a request for the new access code via the wireless communication interface.

If a retry is not allowed in block 614, the process proceeds to block 618 to log the failed run-time authentication, and to prevent access to the memory or to the DSDs in block 620. The number of retries may be a predetermined number of allowed retries stored in a memory of the DSD or the server. The attempt count may be compared to the predetermined number of allowed retries in block 614 to determine whether an authentication retry is allowed. In implementations where authentication must be successful on the first attempt, blocks 614 and 616 may be omitted so that the failed authentication attempt is logged in block 618 if the access code is not valid in block 610, and access is prevented in block 620 without allowing another attempt to authenticate.

By periodically requiring wireless authentication of the DSD as in FIG. 6, it is ordinarily possible to ensure that the DSD remains within a physical proximity or wireless range of the access station. This can prevent access to data in the DSD if it is physically moved to a different area away from the access station, even if the DSD was previously unlocked.

Figure 7:
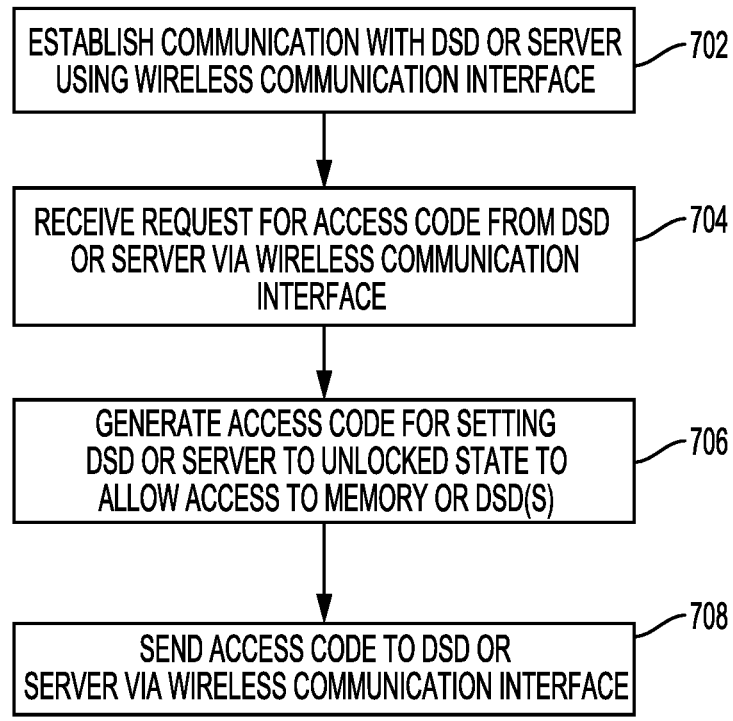
FIG. 7 is a flowchart for an access station authentication process according to an embodiment.

FIG. 7 is a flowchart for an access station authentication process that can be performed by a processor of an access station executing authentication application 20 according to an embodiment. As with the example authentication processes of FIGS. 5 and 6 discussed above, the access station in some implementations may be a server that wirelessly authenticates the DSDs in the server.

The process of FIG. 7 may be initiated by a wireless signal received from a DSD or a server, or from a wired or wireless signal received from management device 102 indicating that a DSD or server needs to be authenticated. In some cases, the DSD or server may send a wireless signal, such as a beacon, as part of its initialization after power-up.

In other cases, the DSD or server may be a new DSD or server identified by management device 102 or by another device, such as a server including a new DSD. A DSD or server may be identified for authentication by, for example, checking configuration settings of the DSD or the server to determine that there is no password or encryption set for the DSD or server, or that the DSD or server has not been authenticated based on the status of an authentication flag in the configuration settings. In other examples, a database of DSD or server identifiers, such as serial numbers or Internet Protocol (IP) addresses, can be checked to determine that a DSD or server needs to be authenticated. In another example, a new DSD or DSDs in the server could be scanned by management device 102 or by the access station to determine that the DSD or DSDs in the server do not store any user data 16.

In block 702, a processor of the access station establishes wireless communication with a DSD or with a server using, for example, a Bluetooth, WiFi, or NFC standard. In some implementations, the access station may initiate the communication based on an indication that a DSD or server needs to be authenticated. In other implementations, the DSD or server may initiate the communication by sending a beacon using a wireless signal to identify the DSD or the server.

In block 704, the processor receives a request for an access code from the DSD or the server. The request for an access code may be part of an authentication process performed by the DSD or the server, such as the authentication processes of FIGS. 5 and 6. As discussed above, the DSD or the server may be in a locked state during a boot-up process, as in the authentication process of FIG. 5, or may be in a locked state due to a periodic authentication becoming due, as in the authentication process of FIG. 6.

In response to the request, the processor in block 706 generates an access code for setting the DSD or the server to an unlocked state to allow access to the memory of the DSD (e.g., memory 130) or to allow access to one or more DSDs in the server. The processor of the access station can generate the access code using a symmetric key shared with the DSD or the server to encrypt a message, such as a time when the access code is generated or another time-based message. In generating the access code, the processor may use a local clock at the access station or may obtain a network time, or a time from management device 102.

In block 708, the processor of the access station sends the access code generated in block 706 to the DSD or the server using the wireless communication interface of the access station. In some implementations, the access station may receive one or more additional requests for an access code in implementations where authentication retries are allowed. In such implementations, a new access code is generated in block 706, and sent to the DSD or server in block 708.

Figure 8:
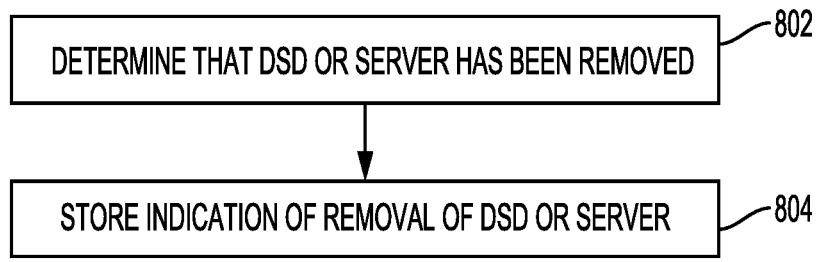
FIG. 8 is a flowchart for a DSD or server removal logging process according to an embodiment.

FIG. 8 is a flowchart for a DSD or server removal logging process that can be performed by a processor of an access station according to an embodiment. In the example of FIG. 8, the access station keeps a record of when a DSD or a server is removed from service (e.g., powered off or removed from the data network) or physically removed. This information can be used by the access station to prevent the access station from sending new access codes for unlocking the DSD or the server after it has been removed. In addition to conserving processing and memory resources of the access station, preventing the access station from sending new access codes may also prevent the interception and unauthorized remote use of a new access code to attempt to unlock a DSD that has been taken offsite.

As with the example authentication processes of FIGS. 4 to 7 discussed above, the access station in the removal logging process of FIG. 8 can include a dedicated access station (e.g., access stations 104A, 104B, or 104C in FIG. 1), or a server that acts as an access station for the DSDs in the server (e.g., server 108D in FIG. 1).

In block 802, the access station determines that the DSD or the server has been removed. This determination may be made based on an indication from management device 102 as a result of a user input at management device 102, an indication from a user input at the access station, or a signal sent from the DSD or the server to the access station indicating that it has been removed from service.

In block 804, the access station stores an indication that the DSD or the server has been removed. The indication may be stored, for example, in a local memory of the access station, such as in memory 142 of access station 104A in FIG. 2 or in memory 152 of server 108D in FIG. 3. In some cases, the DSD or server may later be added back into service, and the indication updated to indicate that the DSD or server has returned to service so that the access station can send new access codes to authenticate the DSD or server.

Wireless Monitoring and Access Examples

Figure 9:
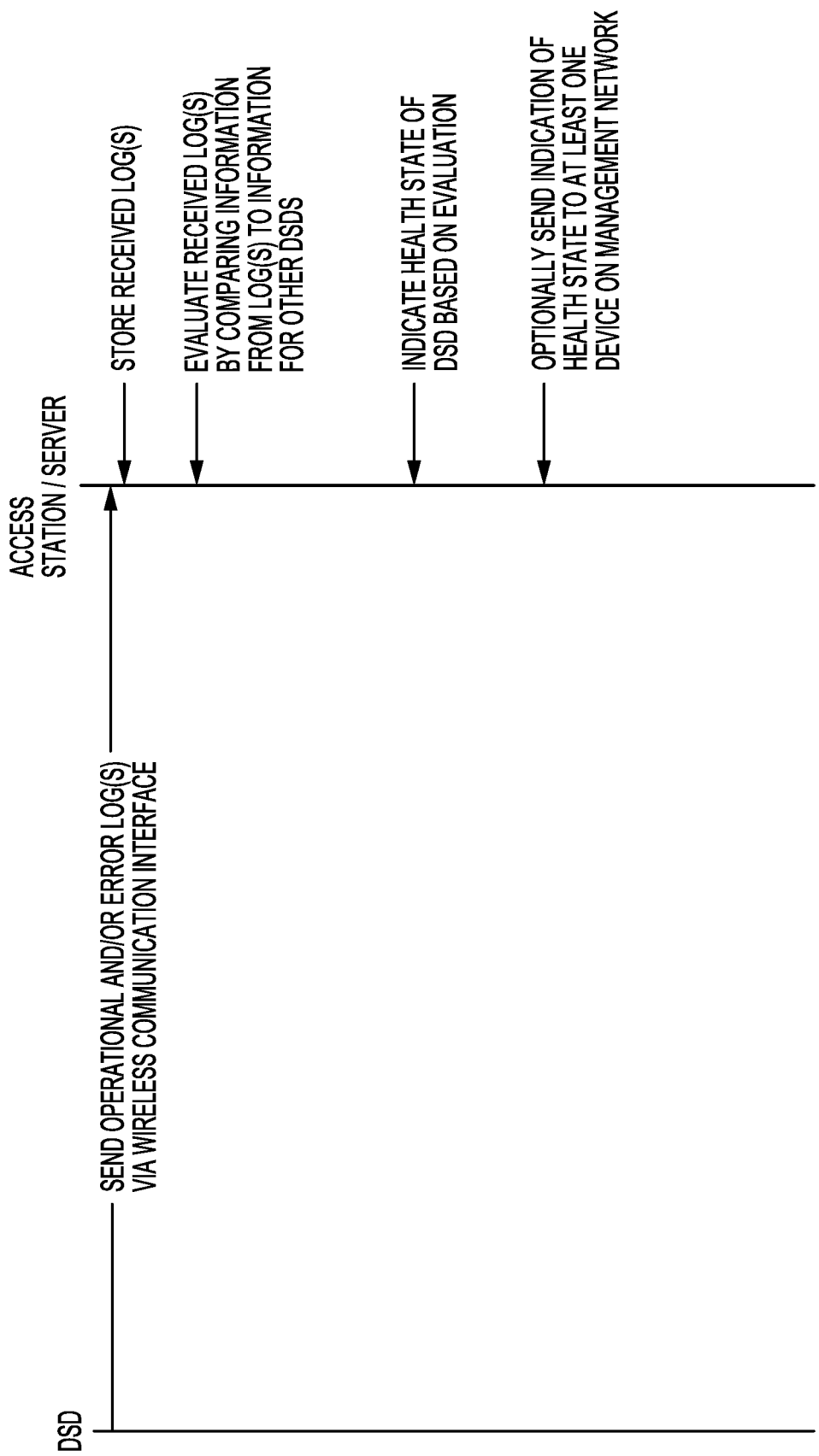
FIG. 9 is a sequence diagram for wirelessly monitoring a health status of a DSD according to an embodiment.

FIG. 9 is a sequence diagram for wirelessly monitoring a health status of a DSD according to an embodiment. By using an access station to wirelessly monitor the health status of a DSD and store operational or error logs at the access station, more logs can ordinarily be stored at the access station for troubleshooting or diagnosing problems without consuming storage space on the DSD. In addition, the wireless communication with the access station to send the logs to the access station does not ordinarily reduce the bandwidth or otherwise affect the data traffic for user data stored in the DSD. By storing such device-level logs outside the DSD, it is ordinarily possible to retain more logs for diagnosis or future analysis, since the limited storage space on the DSD is not consumed by the logs.

As noted above, since data centers do not typically allow for failed DSDs to be removed from the data center, technicians usually troubleshoot and repair or replace a DSD or server on site. However, the present disclosure can allow the access station to be removed from the data center since it does not store any of the protected user data (e.g. user data 16 in FIGS. 2 and 3) for remote diagnosis and troubleshooting of a failed DSD or server. In such implementations, another access station within a wireless communication range of remaining DSDs or remaining servers previously authenticated by the removed access station, may temporarily be substituted for the removed access station.

In the sequence diagram of FIG. 9, a DSD sends one or more operational and/or error logs to an access station or server via a wireless communication interface of the DSD. In some examples, the access station may be a server that wirelessly communicates with the DSD, such as in the example of server 108D in FIG. 1. The operational logs or error logs can include, for example, certain logs from logs 10 in FIGS. 2 and 3. The operational or error logs may include drive-level information, such as, an amount of time that the DSD has been in operation, a number of write commands performed to write data in the DSD or an amount of data written in the DSD, a remaining available storage capacity in the DSD, a defect mapping of a storage media, a number of read and/or write errors, or a count or timestamps for failed authentication attempts.

The access station or server then stores the received log or logs in a memory of the access station or server (e.g., memory 142 of access station 104A in FIG. 2 or memory 152 of server 108D in FIG. 3). After sending this information to the access station or server, the controller of the DSD may then erase or otherwise free the memory used to store the sent log or logs.

The received log or logs may be evaluated by the access station or the server to determine a health state or status of the DSD. In some implementations, the access station or server can evaluate the received log or logs by comparing information from the log or logs to information collected from logs of other DSDs wirelessly sent to the access station or server. For example, an access station may be able to identify a particular DSD that has a larger number of errors or more operations performed as compared to other DSDs that are in wireless communication with the access station. This comparison may be used to identify a health state or usable lifetime expectancy of the DSD, which may optionally be sent to at least one device on a management network, such as management device 102 for reporting purposes. In other cases, the health state determined from the evaluated log or logs may remain at the access station for future diagnosing or troubleshooting of the DSD with logs received from the DSD.

Figure 10:
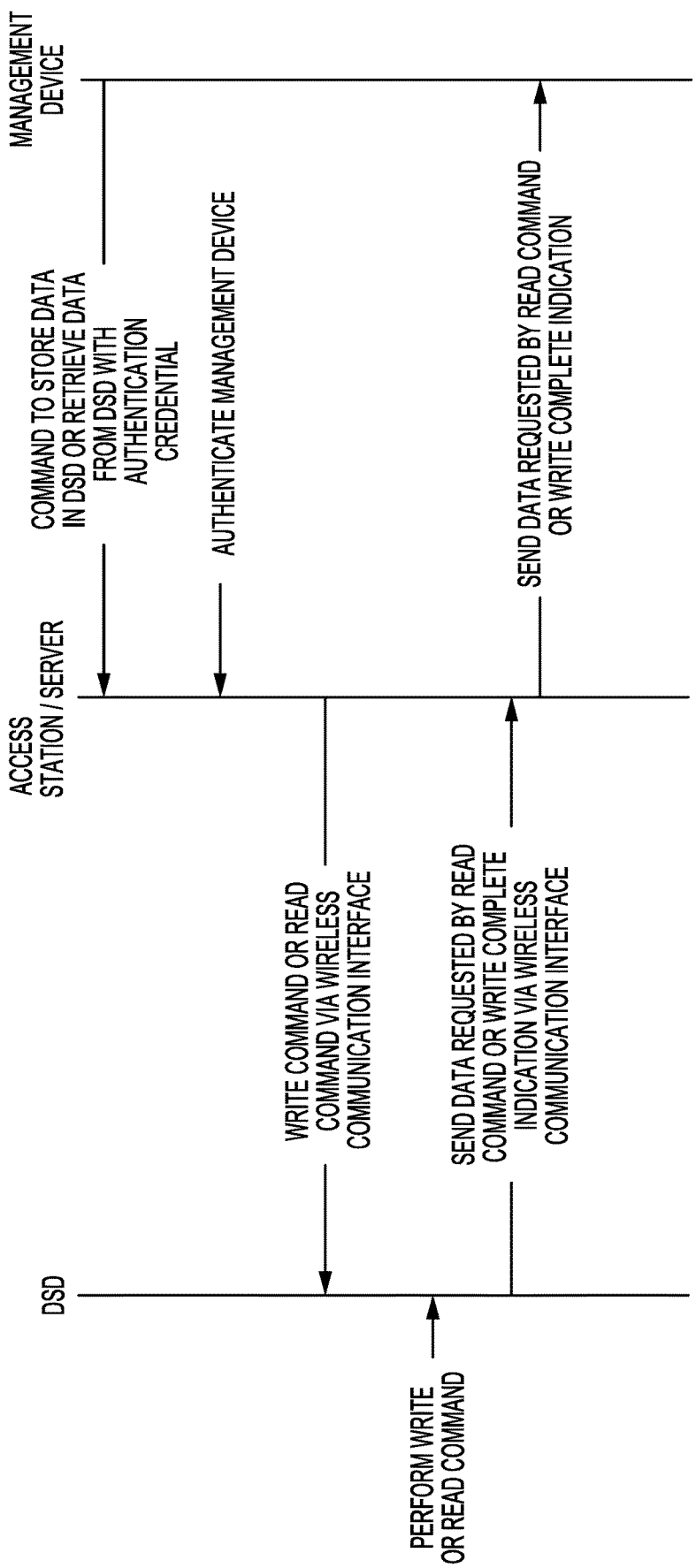
FIG. 10 is a sequence diagram for wirelessly accessing a DSD according to an embodiment.

FIG. 10 is a sequence diagram for wirelessly accessing a DSD according to an embodiment. The process of FIG. 10 can ordinarily provide an additional or backup way of accessing data stored in a DSD that may not be otherwise accessible via a data network. For example, if one or more components of a server such as server 112A in FIG. 2 are not operating properly, such as switch 131, the sequence of FIG. 10 can allow for data to be accessed from DSD 124 via the wireless communication between access station 104A and DSD 124. In another example where a portion of data network 129 or network interface 125 of a DSD is not working properly, data may instead be obtained from a DSD in server 108D of FIG. 3 using wireless communication between server 108D and the DSD.

In the example of FIG. 10, the access station or server receives a command from management device 102 to store data in a DSD or retrieve data from the DSD. The access station or server may authenticate management device 102 or the command by, for example, checking credentials included with the command against credentials stored at the access station or server.

After authenticating management device 102 or the received command, the access station or server wirelessly sends the command to the DSD or a server including the DSD via a wireless communication interface. The DSD performs the write or read command received from the access station or server, and sends the data requested by a read command or a write complete indication for a received write command back to the access station or server via a wireless communication interface of the DSD.

The access station or server then sends the data for the read command or the write complete indication back to management device 102. As noted above, this can ordinarily allow for the access of data from the DSD when other paths of communication have failed or are not operating properly.

In addition, the use of wireless communication between a DSD or server and an access station as described above can ordinarily allow for a physical or location-based authentication so that the DSD or server can only be accessed when it is within relatively close physical proximity to the access station. The access station may also serve as a repository for operational and error logs for DSDs within a wireless communication range of the access station, which can reduce the need to retain such logs in the DSD or server, or allow for the use of logs that may otherwise not be retained at all.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a DSP, an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive.

What is claimed is:

1. A Data Storage Device (DSD), comprising:
a memory for storing data;
a wireless communication interface; and
a controller configured to set the DSD to an unlocked state to allow access to the memory by at least:
establishing communication with an access station using the wireless communication interface;
receiving an access code from the access station via the wireless communication interface;
determining whether the received access code is valid; and
in response to determining that the received access code is valid, setting the DSD to an unlocked state to allow access to the memory; and
wherein the controller is further configured to:
request a new access code via the wireless communication interface from the access station to ensure that the DSD is within a physical proximity of the access station after at least one of: (1) a predetermined amount of time since a previous authentication, (2) after access of a predetermined amount of data in the memory, and (3) after a change in data access that is greater than a threshold;
receive the new access code from the access station via the wireless communication interface, wherein the new access code is generated using a new current time;
determine whether the new access code is valid; and
in response to determining that the new access code is not valid, set the DSD to the locked state.

2. The DSD of claim 1, wherein in determining whether the received access code is valid, the controller is further configured to determine whether a time that the access code was generated corresponds to a current time.

3. The DSD of claim 1, wherein in response to determining that the received access code is not valid, the controller is further configured to:
determine whether another attempt to set the DSD to the unlocked state is allowed; and
in response to determining that another attempt to set the DSD to the unlocked state is not allowed, perform at least one of shutting down the DSD, preventing future use of the DSD, and damaging at least one component of the DSD to prevent access to the memory.

4. The DSD of claim 1, wherein setting the DSD to the unlocked state includes enabling decryption of data stored in the memory.

5. The DSD of claim 1, wherein the controller is further configured to set the DSD to a locked state, and wherein the controller blocks the performance of commands to access data in the memory.

6. The DSD of claim 1, wherein the access station is a server that provides at least one of power to the DSD and a connection to a network.

7. The DSD of claim 1, wherein the controller is further configured to send at least one of an operational log and an error log to the access station via the wireless communication interface.

8. The DSD of claim 1, wherein after setting the DSD to the unlocked state, the controller is further configured to:
receive, via the wireless communication interface, a command from the access station to write data in the memory or read data from the memory; and
perform the command in response to the command received from the access station.

9. The DSD of claim 1, wherein the controller is further configured to:
acquire a current time; and
determine whether the acquired current time is greater than a previous time logged from a previous authentication that set the DSD to the unlocked state.

10. The DSD of claim 1, wherein the controller is further configured to determine whether the received access code is valid by determining whether an encoded time included in the access code corresponds to a current time.

11. An access station, comprising:
a wireless communication interface; and
means for:
establishing communication with a Data Storage Device (DSD) using the wireless communication interface;
generating an access code for setting the DSD to an unlocked state to allow access to a memory of the DSD;
sending the access code to the DSD via the wireless communication interface, wherein the DSD determines whether the sent access code is valid;
receiving a request from the DSD via the wireless communication interface for a new access code after sending the access code; and
in response to receiving the request from the DSD for the new access code:
generating the new access code using a new current time; and
sending the new access code to the DSD via the wireless communication interface to ensure that the DSD is within a physical proximity of the access station, wherein the DSD determines whether the new access code is valid.

12. A method for setting a Data Storage Device (DSD) to an unlocked state to allow access to a memory of the DSD, the method comprising:
establishing communication with an access station using a wireless communication interface;
receiving an access code at the DSD from the access station via the wireless communication interface;
determining by the DSD whether the received access code is valid;
in response to determining that the received access code is valid, setting the DSD to an unlocked state to allow access to the memory;
requesting by the DSD a new access code via the wireless communication interface from the access station to ensure that the DSD is within a physical proximity of the access station after at least one of: (1) a predetermined time since a last authentication, (2) after access of a predetermined amount of data in the memory, and (3) after a change in data access that is greater than a threshold;
receiving the new access code at the DSD from the access station via the wireless communication interface, wherein the new access code is generated using a new current time;
determining at the DSD whether the new access code is valid; and
in response to determining that the new access code is not valid, setting the DSD to the locked state.

13. The method of claim 12, wherein determining whether the received access code is valid includes determining whether a time that the access code was generated corresponds to a current time.

14. The method of claim 12, wherein in response to determining that the received access code is not valid, the method further comprises:
determining whether another attempt to set the DSD to the unlocked state is allowed; and
in response to determining that another attempt to set the DSD to the unlocked state is not allowed, performing at least one of shutting down the DSD, preventing future use of the DSD, and damaging at least one component of the DSD to prevent access to the memory.

15. The method of claim 12, wherein after setting the DSD to the unlocked state, the method further comprises:
receiving, via the wireless communication interface, a command from the access station to write data in the memory or read data from the memory; and
performing the command in response to the command received from the access station.

16. The method of claim 12, wherein a server receives the access code from the access station and determines whether the received access code is valid, and wherein the server provides at least one of power to the DSD and a connection to a network for the DSD.

17. The method of claim 12, wherein the access station is a server that provides at least one of power to the DSD and a connection to a network for the DSD.

18. The method of claim 12, further comprising:
acquiring a current time; and
determining whether the acquired current time is greater than a previous time logged from a previous authentication that set the DSD to the unlocked state.

19. The method of claim 12, further comprising determining by the DSD whether the received access code is valid by determining whether an encoded time included in the access code corresponds to a current time.

20. A method for setting a Data Storage Device (DSD) to an unlocked state to allow access to a memory of the DSD, the method comprising:
establishing communication with the DSD using a wireless communication interface;
generating an access code for setting the DSD to the unlocked state;
sending the access code to the DSD via the wireless communication interface, wherein the DSD determines whether the sent access code is valid;
receiving a request from the DSD via the wireless communication interface for a new access code after sending the access code; and
in response to receiving the request from the DSD for the new access code:
generating the new access code using a new current time; and
sending the new access code to the DSD via the wireless communication interface to ensure that the DSD is within a physical proximity of the access station, wherein the DSD determines whether the new access code is valid.

21. The method of claim 20, wherein the access code is generated based on a current time.

22. The method of claim 20, further comprising receiving at least one of an operational log and an error log of the DSD via the wireless communication interface.

23. The method of claim 22, further comprising:
evaluating at least one of the operational log and the error log; and
indicating a health state of the DSD based on the evaluation.

24. The method of claim 23, wherein evaluating at least one of the operational log and the error log includes comparing information from at least one of the operational log and the error log to information received for a plurality of other DSDs in communication with the access station.

* * * * *